W. W. WILDMAN & E. A. TINSMAN.
PROCESS OF PRODUCING PUNCTURE SEALING RUBBER TIRES.
APPLICATION FILED JULY 12, 1915.
1,217,888.  Patented Feb. 27, 1917.
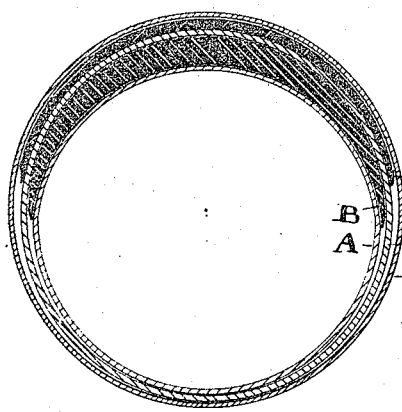
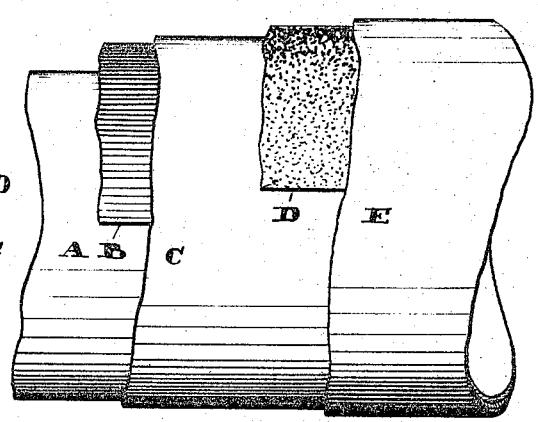
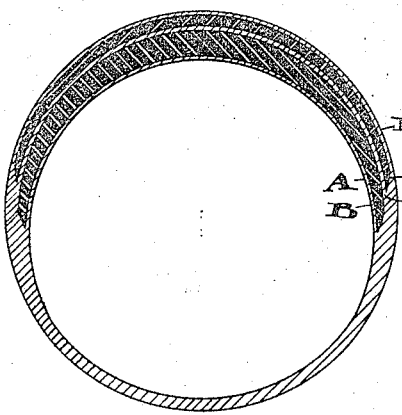
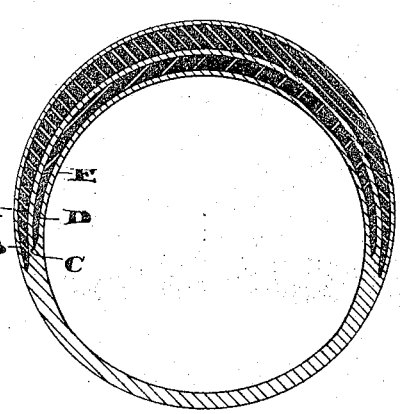
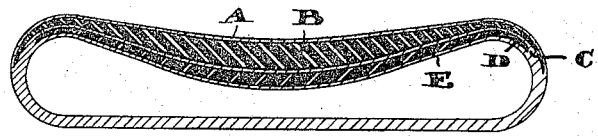
WITNESS
Geo. E. Kricker.
INVENTORS
W. W. WILDMAN.
E. A. TINSMAN.
BY Fisher & Moser
ATTORNEYS.

UNITED STATES PATENT OFFICE.

WILLIAM W. WILDMAN AND EDGAR A. TINSMAN, OF BARBERTON, OHIO, ASSIGNORS OF ONE-THIRD TO JAMES CHRISTY, OF CLEVELAND, OHIO.

PROCESS OF PRODUCING PUNCTURE-SEALING RUBBER TIRES.

1,217,888.  Specification of Letters Patent.  Patented Feb. 27, 1917.

Application filed July 12, 1915. Serial No. 39,255.

*To all whom it may concern:*

Be it known that we, WILLIAM W. WILDMAN and EDGAR A. TINSMAN, citizens of the United States, residing at Barberton, in the county of Summit and State of Ohio, have invented certain new and useful Improvements in the Process of Producing Puncture-Sealing Rubber Tires, of which the following is a specification.

Our invention relates to rubber tires and the object of the invention involves the collocation of separate plies of vulcanized and unvulcanized rubber stock in particular relations and the vulcanization and telescoping thereof *in situ* to produce a pneumatic rubber tube or tire of unitary and inseparable construction adapted to seal itself automatically after receiving a puncture and while still inflated.

In the accompanying drawing, Figure 1 is a transverse section and Fig. 2 a side view of the several assembled tire parts preliminary to their vulcanized and unified state and before being telescoped or turned inside out. Fig. 3 is a transverse section corresponding to Fig. 1 and showing the parts united by vulcanization. Figs. 4 and 5 are transverse sections of the completed tire as it appears after being telescoped, Fig. 4 showing the tire inflated as in use, and Fig. 5, deflated.

The process of making this tire consists, first in enveloping a straight mandrel with a relatively thin ply of pure gum stock or soft elastic compounded stock containing sulfur, thereby forming a straight tube A of a fixed diameter. Then a second ply of compounded rubber stock in the form of a crescent-shaped strip B is placed on the upper side of tube A. This strip B is materially thicker than tube A and consequently less elastic than said tube, and it is also of a different quality or character, being a composite rubber of less pliability and stretch than the pure gum constituting tube A. This compound rubber strip B also contains sulfur. A third ply is now built or placed around tube A and strip B, this ply consisting of a straight tube C of pure gum stock containing sulfur, and said ply or tube C is relatively thin and closely envelops the bottom side of tube A and the outer side of strip B. The next step consists in placing a fourth ply upon the upper side of tube C, which fourth ply consists of a strip D of pure gum in the raw state, the condition of which is sticky and tacky. No sulfur is incorporated with or in strip D as it is expressly intended that no vulcanization of this strip shall occur within its interior, but that it shall remain sticky and tacky. Strip D is of substantially the same width as strip B and practically overlaps the same. Another ply, the fifth, is now placed in position, which ply comprises a straight tube E of pure gum with sulfur added thereto, the said tube being snugly sleeved or built upon the tacky raw strip D and around the middle tube C. The three tubes A, C and E are of substantially the same relative thickness and like constituent properties, but of different diameters; and the two strips B and D are of different thicknesses and also different inherently compared with each other and said tubes.

Then this five ply product is wrapped in muslin, placed in a vulcanizer and subjected to heat for a predetermined period of time until properly vulcanized or cured. In this vulcanizing step, the three tubes A, C and E and the compound strip B, all of which contain sulfur, are vulcanized together in a unitary structure, but the tacky raw strip D is not vulcanized throughout but only superficially at its contacting areas with the sulfur-treated tubes E and C. In other words the tubes E and C are united by vulcanization with the raw strip D but the sticky and tacky property of the raw rubber is not materially changed. After vulcanization has taken place, the tire is stripped from the mandrel by telescoping it, that is to say, it is turned back upon itself to bring the inner portions represented by the smallest tube A and crescent strip B upon the outside, and largest tube E and tacky strip D upon the inside. The natural effect of this telescoping step is to stretch the rubber tube C and strip B to a larger diameter than as formed originally, and to contract portions E and D to a smaller diameter. At the completion of the stripping operation the thicker and stiffer crescent strip B of compounded rubber also contracts the entire tube to some extent, and the result is that the inner part of the tire composed of both vulcanized and raw stock is placed in a state of compression. Thus when a nail is driven through the tube and pulled out again the nail hole immediately closes and the raw stock being tacky effectively seals the opening. After telescoping the straight tube the two ends are brought together and united to form a complete endless tire, and it is important in this proceeding to make the larger outside circumference of the endless tire the exact size of the larger inner circumference of the endless tread portion of the tire casing within which it is to be used eventually, the reason being that the outside or thicker portion of the tire possesses the least elasticity on account of its five-ply construction and because the crescent-shaped and thickest ply B is a comparatively stiff and solid rubber compound. No fabric or similar material is embodied in this tire, each and all the plies being made of rubber. For this reason a perfect union can be obtained between all the plies by vulcanization and all breaking off or severance between the plies is avoided particularly at the tapering edges of the strips B and D where more or less of a shearing action occurs when the tire is telescoped or turned inside out in the making and also when the completed tire is inflated and bearing a load. In this way, a long life is assured to the tire, and although it is possible to puncture the tire, such puncturing is without ill effect as the compressed and tacky embodiment D immediately closes the opening from the inside upon withdrawal of the puncture-producing instrument.

What we claim is:

1. The process of producing a puncture sealing rubber tire consisting, first, in enveloping a straight mandrel with a relatively thin ply of gum stock containing sulfur; then placing a ply of composite rubber stock more or less impregnated with sulfur and of crescent form in cross section on the upper side of the said tube; then drawing a relatively thin tube of pure gum stock containing sulfur over the first two elements and afterward placing a strip of pure gum lengthwise over the said tube and relatively over the crescent shaped composite rubber ply; and then enveloping the whole with a straight tube of sulfurized pure gum and vulcanizing all the elements together and then reversing the completed tube upon itself and uniting the ends thereof to form an endless tire.

2. The process of producing a puncture-sealing pneumatic tire consisting, first, in collocating separate plies of rubber tubes and strips, respectively, treated with sulfur and a strip of untreated raw rubber inclosed within the outer of said tubes; then vulcanizing said tubes and strips *in situ*, and then reversing said vulcanized tubular product and finally uniting the ends thereof to form an endless tire.

In testimony whereof we affix our signatures in presence of two witnesses.

WILLIAM W. WILDMAN.
EDGAR A. TINSMAN.

Witnesses:
J. REID,
H. L. ARBOGAST.